United States Patent [19]

Anitoff

[11] Patent Number: 4,606,651
[45] Date of Patent: Aug. 19, 1986

[54] ENERGY MEASURING PROCESS AND APPARATUS

[75] Inventor: Oleg Anitoff, Bievres, France

[73] Assignee: Commissariat a l'Energie Atomique, Paris, France

[21] Appl. No.: 436,794

[22] Filed: Oct. 26, 1982

[30] Foreign Application Priority Data

Nov. 10, 1981 [FR] France ............................. 81 21024

[51] Int. Cl.⁴ ........................................... G01K 17/20
[52] U.S. Cl. ........................................ 374/32; 250/352; 356/326
[58] Field of Search ........................ 374/32; 250/352; 324/61 R; 356/326

[56] References Cited

U.S. PATENT DOCUMENTS

| | | | |
|---|---|---|---|
| 3,670,570 | 6/1972 | Briones | 374/32 |
| 3,783,685 | 1/1974 | Zeiders, Jr. et al. | 374/32 |
| 3,939,706 | 2/1976 | Pinson | 374/32 |
| 4,084,101 | 4/1978 | Sher | 250/336 |
| 4,094,608 | 6/1978 | Young | 356/326 |
| 4,208,624 | 6/1980 | Miller | 324/60 R |
| 4,381,148 | 4/1983 | Ulrich et al. | 374/32 |

FOREIGN PATENT DOCUMENTS 1312879 4/1973 United Kingdom .
785659 4/1979 U.S.S.R. ........................ 374/32

Primary Examiner—Charles Frankfort
Assistant Examiner—Thomas B. Will
Attorney, Agent, or Firm—Oblon, Fisher, Spivak, McClelland & Maier

[57] ABSTRACT

The invention relates to an apparatus and to a process for measuring the energy supplied in particular by a pulsed laser beam. The apparatus comprises a material having a high dipole moment and freely orientable dipoles. This material is able to absorb the energy supplied by the beam, the interaction of the beam and the material leading to a temperature rise in the latter, which is proportional to the energy absorbed. This leads to a variation in the dielectric constant of the material. In addition, an apparatus is provided which make it possible to measure the variation of the dielectric constant.

12 Claims, 2 Drawing Figures

ENERGY MEASURING PROCESS AND APPARATUS

BACKGROUND OF THE INVENTION

The present invention relates to a process and to an apparatus for the fast measurement of energy. It in particular makes it possible to repetitively measure the energy supplied by a pulsed laser in a very broad spectral range from ultra-high frequencies to ultraviolet.

The presently used apparatuses or sensors for measuring energy supplied in particular by a laser beam are directly based on the sensors or detectors used in infrared spectrometry and whose characteristics have been optimized. These optimized sensors, not initially designed for this type of application, do not necessarily form the best possible choice for this type of application.

They are essentially constituted by pyroelectric sensors or optionally bolometers having three separate parts. As can be gathered from FIG. 1, these sensors comprise a thin layer of an absorbent material 2, whose absorption spectrum must be as wide as possible, i.e. it must absorb energy from a laser pulse corresponding to a wavelength ranging from the more or less remote infrared to the ultraviolet. This thin layer of absorbent material 2 converts the energy of the laser pulse into heat. Although the conversion time of the energy of the laser photons into thermal energy is very short, generally approximately 1 picosecond, the layer of absorbent material 2 must, by its very nature, be physically separated from the second part 4 constituting the sensors. This physical separation leads to a first limitation of the response time of the sensor linked with the transfer time $T_1$ of the thermal energy supplied by the thin layer of absorbent material 2 to the second part 4 of the sensor.

This second part 4 makes it possible to convert the thermal energy into an electrical signal proportional thereto. This second part is generally, but not exclusively, formed from a pyroelectric ceramic material, at whose terminals appears a potential difference, in open circuit, which is proportional to its heating. This potential difference is then transmitted to an electrical measuring apparatus.

In view of the fact that the pyroelectric ceramic has a very high internal impedance, its output impedance must be lowered via an impedance reducing circuit generally formed by a MOS transistor 6. To avoid the interception of unwanted electrical signals, the MOS transistor must be positioned as close as possible to the pyroelectric ceramic and must be integrated into the sensor. This MOS transistor forms the third part of the sensor. The resistor R connected to the terminals of the pyroelectric ceramic 4 represents the leakage resistance of the grid 8 of the transistor and capacitor $C_d$ connected to the drain and to the grid of the transistor by means of resistor R represents the bypass capacitor of the transistor supply source. The measuring signal is collected at S.

Moreover, due to the fact that the pyroelectric ceramic has a very high impedance, the latter unfortunately has a high parallel capacitance. This high capacitance, represented in dotted lines in FIG. 1 and carrying reference C, introduces a time constant $T_2$, which is much higher than the transfer time $T_1$ of the thermal energy of the thin layer of absorbent material 2 to the pyroelectric ceramic 4. Thus, this time constant varies from 10 to 30 ms, whilst the transfer time $T_1$ varies from 1 $\mu$s to 1 ms. Consequently, the high sensitivity of such a sensor can only be obtained close to a high time constant, which limits the maximum repetition frequency of the energy measurements supplied in particular by a laser beam at 100 Hz. This is inadequate for repetitively measuring the energy supplied by a modern pulsed laser, which reaches a frequency of several kHz.

It should be noted that the time interval separating two successive measurements has nothing to do with the minimum duration of a laser pulse which can be detected by the sensor. The latter is equal to the conversion time of the energy of the photons into heat, i.e. approximately 1 picosecond.

Moreover, such a sensor or detector has a limited spectral response in the remote infrared. Moreover, the complex structure of this sensor leads to a high cost. Finally, the energy absorption takes place in a very small volume constituted by the layer of absorbent material. Thus, the energy density supplied by the laser beam is high there, which leads to a rapid deterioration of the layer of absorbent material so that it is periodically necessary to regenerate the latter by applying a coating to the surface of the absorbent material layer. This regeneration of the latter then requires a complete recalibration of the sensor. Moreover, when the laser energy density is very high, the sensor may be completely destroyed, so that it is necessary to replace the latter, involving high costs.

BRIEF SUMMARY OF THE INVENTION

The present invention relates to an apparatus and to a process for the rapid measurement of energy, which makes it possible to obviate these disadvantages. In particular, it makes it possible to carry out repetitive measurements of the energy supplied by a pulsed laser beam at a repetition frequency at at least 1000 times higher than that carried out with the prior art apparatuses, whilst permitting the measurement of energy levels at least 10 times higher than those which can be measured with the prior art apparatuses. Moreover, the energy measurements can be performed in a spectral range from ultra-high frequencies to the ultraviolet.

More specifically, the invention relates to a process for the rapid measurement of the energy supplied by a beam and particularly the energy supplied by a pulsed laser beam, wherein this beam is supplied to a material having a high dipole moment and dipoles which can be freely oriented, said material being able to absorb the energy supplied by the beam, the interaction between the beam and the material leading to a temperature rise of the material, which is proportional to the energy absorbed, leading to a variation of the dielectric constant of said material, and wherein the variation of the dielectric constant is measured.

It should be noted that the dependence of the dielectric constant of the materials relative to the temperature is well known. However, in view of the small variations of this dielectric constant and through there being no process permitting the rapid measurement of these small variations, this property has not hitherto been envisaged as a means for converting a thermal signal into an electrical signal.

According to another feature of the process according to the invention, the material is a fluid contained in a cell, said fluid being in particular a liquid. In the case of damage caused by an excessively powerful laser pulse, the cell is regenerated by changing the liquid by emptying the cell, without it being necessary to carry out recalibration, which was not the case in the prior art.

According to another preferred feature of the invention, the material is neither polymerizable nor tautomerizable.

According to another preferred feature of the process according to the invention, the material is chosen from the group including asymmetrical nitrated or halogenated derivatives of alkanes having at least three atoms of carbon or aromatic hydrocarbons, asymmetrical oxygenated or nitrogenated heterocyclic compounds, tertiary amines and ketones, whose carbons at α are substituted by alkyl radicals.

Preferably, the material is chosen in the group including nitrobenzene and pentafluoronitrobenzene.

According to another preferred feature of the process according to the invention, the material is formed from a plurality of substances which do not interact with one another and whose energy absorption ranges are complementary. The use of such a material makes it possible to measure the energy supplied by a laser beam in a very broad spectral range from ultra-high frequencies to the ultraviolet, which could not be envisaged in the prior art.

According to a preferred embodiment of the process according to the invention, the material is placed between the two armatures of the frequency tuning capacitor of an in particular high frequency oscillator and the variation of the oscillation frequency of this oscillator is measured, said frequency variation being proportional to the variation of the dielectric constant of the material.

The invention also relates to an apparatus making it possible to measure the energy supplied by a beam of particles and in particular supplied by a laser beam, wherein it comprises a material having a high dipole moment and dipoles which can be freely oriented, said material being able to absorb the energy supplied by the beam, the interaction of the beam of particles and the material leading to a temperature rise of the said material, which is proportional to the energy absorbed, leading to a variation of the dielectric constant of the material, as well as means making it possible to measure this variation of the dielectric constant.

In particular, such an apparatus makes it possible to measure the energy at each shot of a laser, whose repetition frequency is several kHz, which was not possible with the prior art sensors.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

The process and apparatus according to the invention will now be described in connection with the energy supplied by a pulsed laser beam, but it is obvious that this process and this apparatus are not limited to this single application. The invention is in fact applicable to any type of particle beam.

Figure 1:
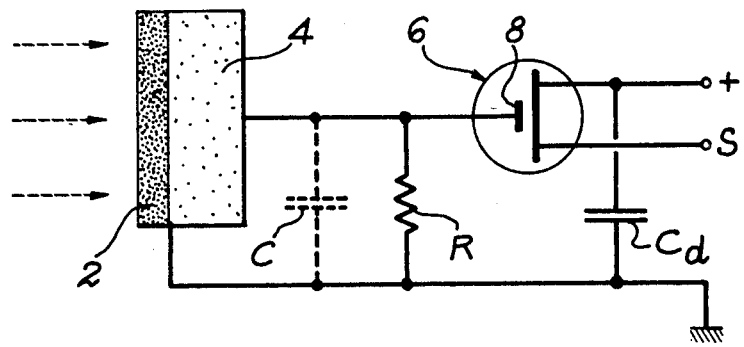
FIG. 1, already described, diagrammatically, an apparatus for measuring the energy supplied by a laser beam, according to the prior art.
Figure 2:
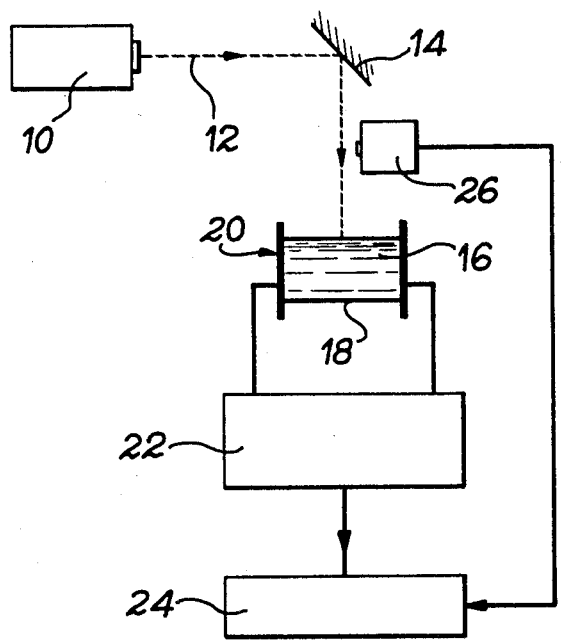
FIG. 2, diagrammatically, an apparatus for measuring the energy, more particularly supplied by a laser beam, according to the invention.

As is diagrammatically shown in FIG. 2, a laser 10 emits a beam 12 which is transmitted, e.g. by means of a mirror 14, to a material 16 able to absorb the energy supplied by beam 12. The interaction between the laser beam and the material leads to a temperature rise within the material, which is proportional to the energy absorbed. This temperature rise leads to a variation in the dielectric constant of the material which is to be measured. The temperature within the material can vary between 4 to 300° K.

The dependence of the dielectric constant of a material with respect to the temperature is essentially linked with the influence of the temperature on the mean orientation of the dipoles of this material. The variation of the dielectric constant $\epsilon$ as a function of the temperature T is governed by the equation $$\frac{d\epsilon}{dT} = - \frac{4\pi N\mu^2}{3kT^2}$$

in which $\mu$ represents the dipole moment of the material, k is the Boltzman constant and N the Avogadro number. This formula consequently implies that the material, in order to be a good thermoelectric converter, must have a high dipole moment $\mu$ and that its dipole must be freely orientable. Thus, this material can e.g. be a fluid and in particular a liquid, although this is not obligatory. Thus, in a certain temperature range, certain solids have a phase in which certain dipoles retain a partial liberty. When using a fluid material, the latter must be placed e.g. in a tight cell 18, as shown in FIG. 2.

Moreover, in order to rapidly measure the energy supplied by the laser beam in a reliable manner, the temperature coefficient of the dielectric constant of the material $$\left(\frac{4\pi N}{3k}\right) \mu^2,$$

i.e. of the dipole moment $\mu$, must be as stable as possible. However, for certain materials and in particular liquids, this temperature coefficient develops in a complex manner, due to the possibility of polymerization or tautomerization on the part of these materials. Examples of such materials are alcohols, which have a complex dielectric behaviour, as a result of the formation of hydrogen bonds between the different alcohol molecules. In order to prevent this problem, the material must be chosen in such a way that it is neither polymerizable nor tautomerizable and in particular in such a way that it cannot form hydrogen bonds.

The absorbent material satisfying the various criteria according to the invention are in general nitrated or halogenated derivatives of aromatic hydrocarbons or alkanes, having at least three carbon atoms, the lighter components being too volatile. For example, reference is made to nitrobenzenes, chlorobenzenes, bromobenzenes, iodobenzenes, nitrotoluenes, chlorotoluenes, bromotoluenes, iodotoluenes, nitroxylenes, chloroxylenes, bromoxylenes, iodoxylenes, etc, as well as nitropropanes, chloropropanes, bromopropanes, iodopropanes, etc. Moreover, these different components must not be symmetrical in order to ensure that there is no compensation between the dipoles of these components. The components having an internal compensation by symmetry such as e.g. trinitro-1,3,5-benzene, tribromomesitylene and dinitro-1,3-propane are not suitable.

The presence of these electrovalency bonds other than $C-NO_2$ or C-X, X representing 8'F, cl, Br or I, not generally being desirable, because the other electrovalency bonds such as C-OH and C-NH often lead to tautomerism or hydrogen bonds. However, the presence of C=O bonds can be envisaged and in particular in asymmetrical oxidized heterocyclic compounds, such as quinones or in ketones, whose carbons at $\alpha$ are substituted by alkyl radicals. In the same way, the C-N bond can be envisaged, particularly in asymmetrical nitrogenated heterocyclic compounds such as pyridine or in tertiary amines.

It should be noted that the material must be able to absorb the wavelengths of the laser beam, whose energy it is wished to measure. The materials, particularly liquids, have three spectral absorption ranges of photons. The first range, called the rotational range, is linked with the rotation of the dipoles of the different molecules forming it and is positioned in the ultra-high frequency range, which is inaccessible to conventional sensors, due to the thinness of their absorbent layer (a few microns). The second range is a vibrational range in the infrared and the third range an electronic range in the visible or ultraviolet.

In the case where the absorption range of the material used does not cover the desired range, it is always possible to change the material. In the case of a liquid material, this change is brought about by emptying cell 18. The change of material has the advantage of being simple to perform and of requiring no recalibration of the apparatus. Moreover, it is always possible to add to said material, one or more substances which are absorbent in complementary energy ranges, so as to cover virtually the entire spectral range, i.e. from ultra-high frequencies to the ultraviolet. These substances which, taken in isolation, can be solid or liquid, must be chosen in such a way that they do not react with one another or with the material to which they are added either by chemical reaction, or by the formation of tautomeric compounds or polymers, which would be prejudicial to the reliability of the apparatus and to its response time. Examples of such substances are cyanines or porphyrins.

When the material is constituted by a main material, to which is added one or more substances, said material must be homogeneous. In the case of a liquid material, the main liquid must be a polar liquid, which is only slightly viscous, non-associated and aprotic, i.e. not able to exchange a proton with the substances added thereto. Moreover, the auxiliary substances must be dissolvable in the main liquid, optionally after modification of certain of these characteristics in order to make the dissolving process possible.

It has already been stated that the addition of one or more substances to a material made it possible to measure the energy supplied by a laser beam in a very wide spectral range, but conversely by selecting one or more substances of very narrow absorption ranges, it is possible to make the apparatus selective with respect to a single value of the energy, i.e. a single wavelength.

According to the invention, the measurement of the variation of the dielectric constant as a function of the temperature rise of said material, resulting from the interaction of the beam particles and of the material, can be effected by introducing the material between the armatures of a frequency tuning capacitor 20 of a conventional oscillator 22. The oscillation frequency of this oscillator is then a simple function of the dielectric constant of the material and, for small variations of the dielectric constant, the variation of the oscillation frequency is proportional to the variation of the dielectric constant. The proportionality coefficient is generally between 0.1 and 0.5. Therefore, the measurement of the energy more particularly supplied by a pulsed laser beam is carried out by measuring the variations of the oscillation frequency of this oscillator.

The measurement of the oscillation frequency of oscillator 22 can be carried out by means of a frequency meter 24, which counts the number of cycles of the signal emitted by the oscillator during a time determined by an internal clock.

In order to accurately determine the frequency of the oscillator, it is necessary to use a thermally and mechanically highly stable oscillator. This can be achieved through using a high frequency oscillator, i.e. having an oscillating frequency at least equal to 10 MHz.

The apparatus and process described hereinbefore make it possible to carry out a repetitive measurement of the energy supplied by pulsed lasers. In order to synchronize the laser shots with the corresponding energy measurement, i.e. with the determinations of the frequency variation of the oscillator by the frequency meter, it is possible to use a fast photodiode 26.

It has been stated hereinbefore that, in order to have a reliable apparatus, the temperature coefficient of the dielectric constant must be as stable as possible. In general, this temperature coefficient is proportional to $1/T^2$. In the case where it is not very stable, it is possible to introduce a temperature correction during the electronic processing by means of a temperature sensor making it possible to calculate the corrective time $1/T^2$.

Thus, the apparatus and process of the invention permit a much faster measurement of the energy supplied optically by a laser beam.

As in the case of a conventional sensor, it is necessary to distinguish between the response time of the sensor, i.e. of the absorbent material, and that of the associated electronics.

The response time of the sensor is firstly dependent on the photon absorption time, which is virtually instantaneous, i.e. less than 1 picosecond and then on the conversion time of the photon excitation into heat. This conversion time is approximately 1 picosecond if the absorption is rotational or vibrational, i.e. in the ultra-high frequency or infrared range. It is between a fraction of a nanosecond and a few microseconds if the absorption is electronic, i.e. in the visible or ultraviolet ranges. This upper limit of a few microseconds will only be reached if the molecules of the absorbent material have a long life triplet state, which can be avoided by a correct choice of material.

Moreover, the response time of the sensor is dependent on the diffusion time of this heat to the complete sensor. This time is shorter than in the prior art apparatuses, in view of the fact that the photothermal converter and the thermoelectric converter, constituted by the absorbent material, are intimately mixed instead of being physically separated. The prior art photothermal converter and thermoelectric converter were respectively the layer of absorbent material and the pyroelectric ceramic. However, a temperature gradient is inevitable through the application of Beer's law.

Beer's law is governed by the equation $dI/I = 68 \cdot dl$, I being the intensity of the beam transmitted by the absorbent material, $\epsilon$ and $dl$ respectively the absorption coefficient of the irradiated thickness of the material. Calculations make it possible to demonstrate that there is a heating gradient proportional to $e^{-\epsilon \cdot l}$. The heating of the absorbent material is thus rendered uniform at the end of a time $t$ equal to $L_m.6$, $L_m$ being the average dimension of the material (e.g. the radius of the sphere with the same volume) and 6 the speed of sound in the material approximately 1000 m/s for a liquid). Therefore, a second temperature homogenization time will appear and is proportional, in the case of a liquid, to the dimensions of the cell containing the liquid and is inversely proportional to the speed of sound in the liquid. This time can be kept well below 1 microsecond by using a small cell and a relatively non-viscous liquid.

Moreover, the response time of the sensor is dependent on the time necessary for ensuring that the temperature rise of the material influences the average orientation of its dipoles. This time is in particular proportional to the volume of the polar molecule constituting the material and to the viscosity of the liquid. This makes it necessary to choose a liquid which is only slightly viscous and formed from small molecules. In the case of a material complying with these criteria, (cf hereinafter), this time is a few tenths of a picosecond.

Thus, the response time of the absorbent material and in particular a liquid, results from the convolution of these different times. As a result of a suitable choice of material (cf the example given hereinafter), this time can be approximately a few dozen nanoseconds. This overall time represents the time necessary for the initial event (photon absorption) to be converted into a physically usable signal (measurement of the oscillation frequency of the oscillator). The acquisition time of the initial event can be less than 1 picosecond. The response time of the associated electronics, which limits the measuring frequency, is approximately 1 microsecond.

Thus, the process of the invention is at least 10,000 times faster than the prior art process, which takes 10 to 30 milliseconds.

Moreover, the energy absorption takes place according to the invention throughout the volume of the cell and not only on the surface of the sensor, as in the prior art. Therefore, the acceptable density per surface unit is at least 10 times higher in energy and 100 times higher in power, as a result of the better thermal exchanges, than in the case of conventional sensors.

A practical embodiment of the invention will now be described and the material corresponding to the aforementioned criteria is nitrobenzene.

Nitrobenzene has a dielectric constant at not very high frequencies of 35.74 at 20° C., having a variation of $d\epsilon/\epsilon \cdot dT$ equal to 0.00225 at 20° C. Moreover, nitrobenzene has absorption bands in the ultraviolet, infrared and an ultra-high frequency absorption linked with its rotational relaxation time, which is 47 ps, i.e. a frequency of approximately 3 GHz. This latter type of absorption band is very wide.

Through dissolving adequate auxiliary substances, it is possible to obtain at any wavelength a solution having an optical density at least equal to 1, i.e. absorbing at least 90% of the incident energy, taking account of the optical path of the laser beam in the sensor liquid. In general terms, cyanines and porphyrines are soluble in the considered solvents without any disturbing interaction and can be chosen so as to absorb throughout the ultraviolet—visible range chosen.

It should be noted that it is always possible to double the optical path of the beam by reflection after a first passage through the cell containing the liquid.

In a practical case of measurement, the cell contains a mass m of 0.3 g of nitrobenzene, whose specific heat $C_v$ is approximately 2 J/g. °K.

If E is the energy of the laser beam absorbed by the material, expressed in Joules, the instantaneous heating thereof is given by the equation: $\Delta T = E/m.C_v$.

By replacing m and $C_v$ by their value, we obtain: $\Delta T = 1.66$ E (K/J). As $d\epsilon/\epsilon = 0.00225 \Delta T$, it can be deduced therefrom that $d\epsilon/\epsilon = 0.0375$ E(J$^{-1}$).

Moreover, the sensitivity of the apparatus according to the invention, corresponding to the minimum variation of the measurable dielectric constant, is linked with the measuring time t by the equation $d \epsilon/\epsilon \cdot t = 10^{-10}$s and from this, by eliminating $\Delta \epsilon/\epsilon$ between the two latter equations, it is possible to deduce that $E.t = 10^{-8}$ J/s.

Thus, the apparatus according to the invention is characterized by a figure of merit equal to the sensitivity obtained in energy for a given measuring time.

It should be noted that the sensitivity of the apparatus according to the invention is 10,000 times greater than that of the prior art apparatuses and that consequently the figure of merit of the apparatus is 10,000 times greater than that of the prior art apparatuses.

Another material satisfying the above criteria is pentafluoronitrobenzene, which has characteristics similar to those of nitrobenzene and makes it possible to increase the power which can be accepted by the apparatus. This power is a function of the ionization of the material under the effect of the electrical field of the laser. In the case of pentafluoronitrobenzene, the ionization threshold is much higher than that of nitrobenzene.

This is obviously only a non-limitative exemplified embodiment of the invention. As stated hereinbefore, asymmetrical nitrated or halogenated derivatives of alkanes having at least three atoms of carbon or aromatic hydrocarbons, as well as oxygenated and nitrogenated asymmetrical heterocycles, tertiary amines and ketones, whose carbons at $\alpha$ are substituted by alkyl radicals, can also be used.

What is claimed is:

1. A process for the fast measurement of energy contained in an energy beam, comprising the steps of:

supplying said beam to a material having a high dipole moment and dipoles whicn can be freely oriented, said material being placed between two armatures of a frequency tuning capacitor of a frequency oscillator and being able to absorb the energy contained in said beam, the interaction between said beam and said material leading to a variation of the dielectric constant of said material; and measuring the variation of the oscillation frequency of said oscillator, said frequency variation being proportional to said variation of the dielectric constant of said material and using said variation of the oscillation frequency of said oscillator as an indication of the energy contained in said energy beam.

2. A measuring process according to claim 1, wherein said material has a temperature which can vary from 4° to 300° C.

3. A measuring process according to claims 1, wherein said material is a fluid, which is then contained in a cell.

4. A measuring process according to claim 3, wherein said fluid is a liquid.

5. A measuring process according to claim 4, wherein said liquid is neither polymerizable nor tautomerizable.

6. A measuring process according to claim 5, wherein said liquid does not form hydrogen bonds.

7. A measuring process according to claim 5, wherein said material is chosen from the group including asymmetrical nitrated or halogenated derivatives of alkanes having at least three atoms of carbon or aromatic hydrocarbons, asymmetrical oxygenated or nitrogenated heterocyclic compounds, tertiary amines and ketones, whose carbons at $\alpha$ are substituted by alkyl radicals.

8. A measuring process according to claim 1, wherein said material is chosen from the group including nitrobenzene and pentafluoronitrobenzene.

9. A measuring process according to claim 1, wherein said material is formed from a plurality of substances, which do not interact with one another and whose energy absorption ranges are complementary.

10. A measuring process according to claim 1, wherein said beam is a pulsed laser beam and the process is used for repetitive measurements of the energy, contained in said pulsed laser beam.

11. An apparatus for the fast measurement of energy contained in an energy beam, comprising:
    a material having a high dipole mement and dipoles which can be freely oriented;
    an oscillator having a frequency tuning capacitor including two armatures;
    said material being placed between said two armatures and being able to absorb the energy contained in said beam, the interaction of said beam and said material leading to a variation of the dielectric constant of the material; and
    means for measuring the variation of the oscillation frequency of said oscillator, the variation of the oscillation frequency of said oscillator being proportional to the variation of the dielectric constant of said material and using said variation of the oscillation frequency of said oscillator as an indication of the energy contained in said energy beam.

12. A measuring apparatus according to claim 11, wherein said oscillator is a high frequency oscillator.

* * * * *